Nov. 24, 1970     E. A. SOTO     3,541,660
APPARATUS FOR ASSEMBLING AND SECURING DRAPERY PANELS
Filed Feb. 28, 1968
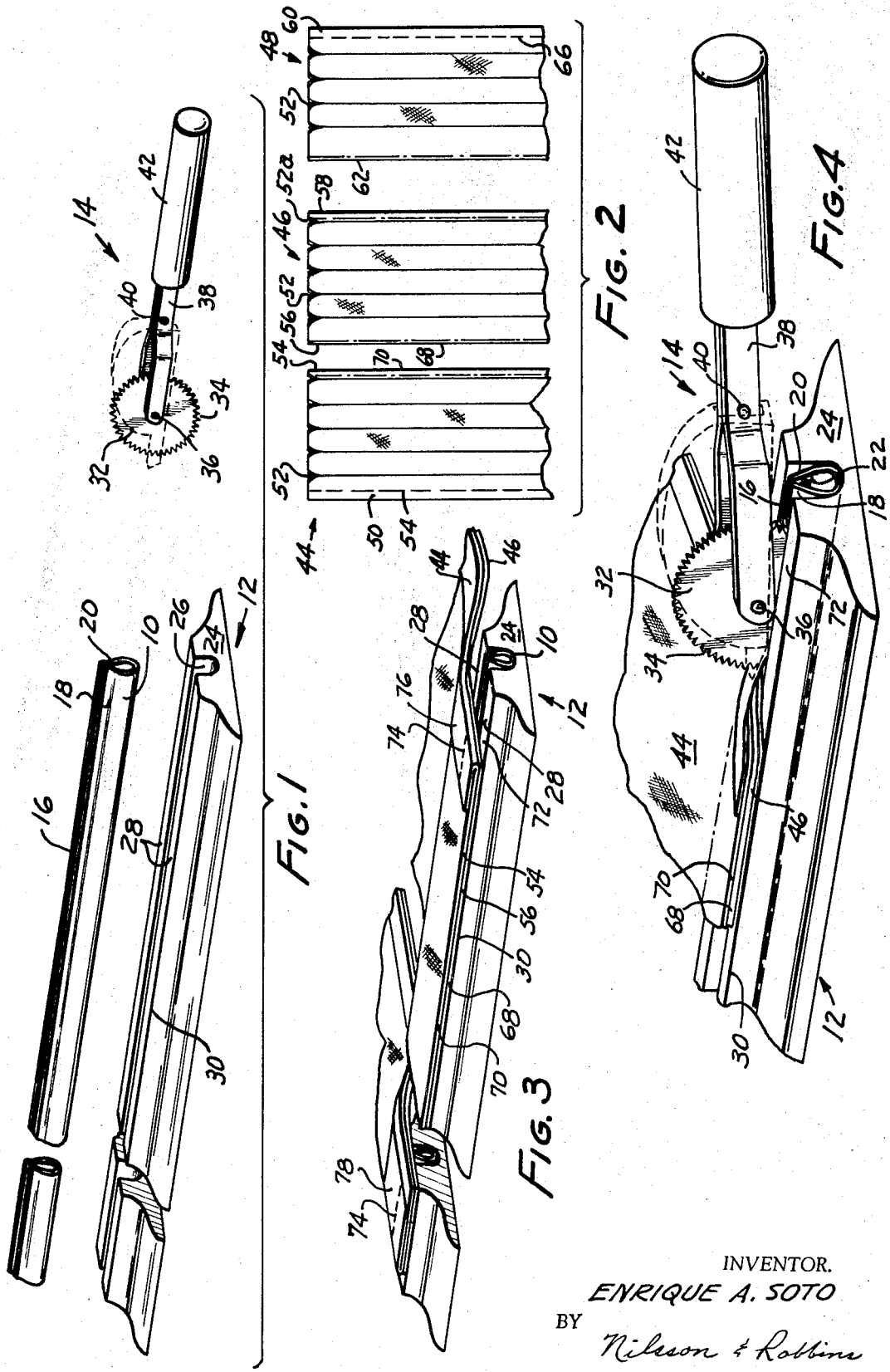
INVENTOR.
ENRIQUE A. SOTO
BY
Nilsson & Robbins
ATTORNEYS.

United States Patent Office 3,541,660
Patented Nov. 24, 1970

3,541,660
APPARATUS FOR ASSEMBLING AND SECURING DRAPERY PANELS
Enrique A. Soto, 981 Montecito Drive,
Los Angeles, Calif. 90031
Filed Feb. 28, 1968, Ser. No. 709,084
Int. Cl. B23p 19/04, 11/02
U.S. Cl. 29—200                         10 Claims

ABSTRACT OF THE DISCLOSURE

An apparatus for forming a smooth seam between fabric drapery panels are disclosed. Portions of material along the edges of the panels are joined with a straight, elongate, resiliently deformable clamp. Prior to joining, the clamp is placed within a jig with the panel edges stacked thereover. A pry presses the fabric edges into the clamp to secure and form the seam.

BACKGROUND OF THE INVENTION

Field of the invention

The field of art to which the invention pertains includes the field of flexible closures, partitions and panels, particularly the hanging and drape types.

Description of the prior art

In the conventional manner of retailing ready-made draperies, the retailer must stock a wide variety of panel sizes. He may stock single width panels with lengths of 36, 48, 54, 72, 84, and 96 inches or longer and similar lengths of 1½ width panels, 2 width panels, 2½ width panels, and so forth. For most retailers this requires stocking only a very limited variety of patterns and colors or else keeping an inordinately large inventory.

An alternative is to stock single width panels and sew them into the desired widths. However, simple stitching can leave puckered seams and many thin fabrics require weights at the seams to prevent puckering and blousing. To custom-sew standing seams is expensive and time-consuming.

None of the foregoing is completely satisfactory. When moving from one house to another, it is rare to be able to utilize the drapes of the previous location without extensive and expensive altering. Also, wide drapes of, say, 10 widths, are unwieldy and difficult to clean.

SUMMARY OF THE INVENTION

The present invention enables ready-made draperies to be converted into smaller or larger widths without sewing and to look and hang as well as the finest custom-sewn draperies. It allows one to quickly and readily join fabric panels and to separate and rejoin the panels at will. An apparatus is provided for joining fabric drapery panels wherein opposed edge portions of two fabric panels are aligned over a straight, elongate, resiliently deformable clamp having jaws lengthwise thereof and the edge portions are inserted within the clamp jaws and doubled back to form a seam between the panels.

The elongate clamp can be generally tubular and extend substantially along the length of the panel. In a particular embodiment, the clamp has a generally oval-shaped cross-section, tapered at a gap to provide opposed resilient clamp jaws. The taper of one or both of the clamp jaws can be made discontinuous, e.g. with ridges or projections, along a substantial portion of the clamp length to provide better gripping surfaces.

A jig is provided, as insertion means, for receiving the clamp and comprises an elongated base having a groove thereon for receiving the clamp. The top surface of the jig is generally planar in the vicinity of the groove for supporting the panel edge portion.

Means are also provided for prying apart the clamp jaws and pressing the fabric edge portions into the clamp. A free-wheeling disk with a serrated or other fabric-gripping edge can be utilized as the prying means.

BRIEF DESCRIPTION OF THE DRAWINGS

FIG. 1 is a perspective view of a jig, clamp and pry utilized in this invention for joining fabric panels;

FIG. 2 is a plan view of the left side, center and right side panels of a three-width drapery, prior to joining;

FIG. 3 is a perspective view of the jig and clamp of FIG. 1, assembled and underlying opposed edges of two fabric panels to be joined; and FIG. 4 is an enlarged view of the components of FIG. 1 in the process of clamping opposed edges of two fabric panels.

DESCRIPTION OF THE PREFERRED EMBODIMENTS

Referring to FIG. 1, a clamp 10, jig 12 and pry 14 are shown. The clamp 10 is an elongated, generally tubular extrusion of resilient fiberglass or plastic, e.g. polystyrene. It has a generally oval-shaped cross-section tapered at a gap 16 to provide opposed resilient clamp jaws 18 and 20. The clamp 10 may be of any color to match a drapery color or may be white or transparent. The taper of one or both clamp jaws may be discontinuous for a better gripping surface, e.g. by providing ridges 22 along the length of the clamp jaws 18 and 20 (see FIG. 4) or with other projections therefrom. There is about 7/16 of an inch between the gap 16 and the bottom of the clamp 10, which is sufficient to allow the clamp 10 to secure several folds of drapery material one-half inch wide.

The jig 12 can be made of wood or other heavy solid material and comprises an elongated base 24 having a groove 26 along its length for the clamp 10. The top surface 28 of the base 24 is generally planar in the vicinity of the groove 26. The groove 26 is hyperbolic in cross-section and is dimensioned to seat the clamp 10 with the clamp gap 16 approximately aligned with the jig top surface 28. With the clamp 10 seated in the groove 26, there is a distance of ½ inch between the left edge 30 of the jig top surface 28 and the clamp gap 16.

The pry 14 comprises a free-wheeling disk 32 having a serrated edge 34, or other frabric-gripping edge. The disk 32 rotates on an axle 36 therethrough, the axle 36 being connected to an end portion of bent metal straps 38 having their opposite ends secured by a rivet 40 and enclosed in a handle 42.

Referring to FIG. 2, the "right" or facing sides of left 44, center 46, and right 48 fabric panels are shown. The left panel 44 has a 1½ inch left side hem 50 defined by stitches 54, five pleats 52 spaced at 4-inch intervals from its left edge, and a ½-inch right edge portion 54. The center panel 46 has ½-inch left and right edge portions 56 and 58, respectively, and five pleats 52 spaced at 4-inch intervals from the left edge portion 56. The furthest right pleat 52a of the center panel 46 is immediately adjacent the right edge portion 58. The right panel 48 has a 1½ inch right side hem 60 definied by stitches 66, four pleats 52 spaced at 4-inch intervals from its right edge, and a ½-inch left edge portion 62. Each ½-inch edge portion 54, 56, 58 and 62 is indicated by a phantom line; their edges may be selvedged but preferably not buckramed.

Referring to FIG. 3, the center fabric panel 46 is shown lying "right" side up over the clamp 10 and the jig surface 28. The left panel 44 is placed "wrong" side up flatly and squarely on top of the center panel 46 so that the left edge portion 56 of the center panel 46 and the edge portion 54 of the left panel 44 have their edges 68 and 70, respectively, aligned along the left edge 30 of the jig top surface 28. A portion 72 of about 1½ inches of the bottom length of the jig 12 is left uncovered to allow insertion of the pry 14. Staples or pins 74 are inserted through the bottom hems 76 and headings 78 along the ½-inch edge portions 54 and 56 to assure an even top and bottom.

Referring to FIG. 3, the pry disk 32 is inserted between the clamp jaws 18 and 20, pressed down to touch the bottom of the clamp 10 and rolled forward, forcing the fabric into the clamp gap 16. During the forward and downward motion, the operator holds the panel edges 68 and 70 flush with the jig surface edge 30. The forward and downward thrust is continued until the two edge portions 54 and 56 are completely submerged into the clamp 10 to join the panels 44 and 46.

The joined panels 44 and 46 are removed from the jig 12 merely by lifting them and the smoothness and length of the joining can be adjusted simply by sliding the materials within the clamp 10.

The foregoing process is repeated for all other joints. The left and right panels 44 and 48 can be joined directly to each other or any number of panels identical to the center panely 46 can be joined between the left and right panels 44 and 48 to provide for draperies of any width.

The method and apparatus here provided can also be used to eliminate puckered seams in already-joined custom drapery. In this case, no pinning is needed and the clamp is placed only between the hem and heading of the panels. About 1½ inches of the bottom length of the jig 12 is left uncovered and the pry 14 is used to roll the bottom panel hem into the jig groove 26. The pry disk 32 meets the panel fabric overlying the clamp and continued forward movement presses the panel fabric into the clamp to form a smooth standing seam.

It will be understood that modifications and variations may be effected without departing from the scope of the novel concepts of this invention.

What is claimed is:

1. Apparatus for joining fabric drapery panels comprising, in combination:
   a straight, elongated clamp having jaws lengthwise thereof and resiliently deformed upon parting said jaws; and
   means for parting said jaws and inserting edge portions of said drapery panels in opposed relation between said jaws whereby to clamp said panel together to thereby form a seam between said panels.

2. The apparatus of claim 1 wherein said clamp is generally tubular and extends substantially along the length of said panels.

3. The apparatus of claim 1 wherein said clamp has a generally oval-shaped cross-section tapering at a gap therein to provide opposed resilient clamp jaws.

4. The apparatus of claim 3 wherein the taper of at least one clamp jaw is discontinuous along a substantial portion of the clamp length.

5. The apparatus of claim 1 wherein said insertion means comprises a jig including an elongated base having a groove therealong formed for seating said clamp lengthwise therein with said clamp jaws outwardly therefrom.

6. The apparatus of claim 5 wherein the top surface of said jig is generally planar in the vicinity of said groove.

7. The appartus of claim 5 wherein said groove is of generally hyperbolic cross-section for receiving said clamp.

8. The apparatus of claim 1 wherein said insertion means comprises means for prying apart said clamp jaws and pressing said fabric edge portions therebetween.

9. The apparatus of claim 8 wherein said prying means comprises a disk-shaped member having a fabric-gripping edge rotatable between said clamp jaws.

10. The apparatus of claim 3 wherein said insertion means comprises:
   a jig having an elongated groove of generally hyperbolic cross-section for receiving said clamp, and
   means for prying apart said clamp jaws and pressing said fabric edge portions therebetween.

References Cited

UNITED STATES PATENTS

| | | | |
|---|---|---|---|
| 1,370,690 | 3/1921 | Jacobs | 29—91.6 |
| 1,556,234 | 10/1925 | Maise | 29—235 |
| 2,342,715 | 2/1944 | Wilson | 229—2.5 |
| 2,654,402 | 10/1953 | Russell et al. | 29—238 X |
| 2,695,445 | 11/1954 | Johnson et al. | |
| 2,882,376 | 4/1959 | Charbonneau | 29—509 X |
| 2,928,154 | 3/1960 | Koehl | 29—235 X |

THOMAS H. EAGER, Primary Examiner

U.S. Cl. X.R.

29—235, 238, 453